United States Patent
Dhoot et al.

(10) Patent No.: US 10,403,287 B2
(45) Date of Patent: Sep. 3, 2019

(54) MANAGING USERS WITHIN A GROUP THAT SHARE A SINGLE TELECONFERENCING DEVICE

(71) Applicant: International Business Machines Corporation, Armonk, NY (US)

(72) Inventors: Akash U. Dhoot, Pune (IN); Nitin S. Jadhav, Pune (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/409,598

(22) Filed: Jan. 19, 2017

(65) Prior Publication Data

US 2018/0204576 A1    Jul. 19, 2018

(51) Int. Cl.
*G10L 17/00* (2013.01)
*H04N 7/15* (2006.01)
*H04L 29/06* (2006.01)

(52) U.S. Cl.
CPC .......... *G10L 17/005* (2013.01); *H04L 65/403* (2013.01); *H04N 7/152* (2013.01)

(58) Field of Classification Search
CPC ..... G10L 17/005; G10L 15/22; G10L 15/265; G06F 3/167
USPC ........................ 704/275, 226, 276
See application file for complete search history.

(56) References Cited

U.S. PATENT DOCUMENTS

| | | |
|---|---|---|
| 6,457,043 B1 | 9/2002 | Kwak et al. |
| 7,844,454 B2 | 11/2010 | Coles et al. |
| 7,920,158 B1 | 4/2011 | Beck et al. |
| 8,390,669 B2 | 3/2013 | Catchpole et al. |
| 8,626,498 B2 | 1/2014 | Lee |
| 9,905,108 B2 * | 2/2018 | Kaplan ............... G08B 21/06 |
| 2003/0181751 A1 | 9/2003 | Harada et al. |
| 2004/0172252 A1 * | 9/2004 | Aoki ................ H04M 3/564 |
| | | 704/270 |
| 2009/0089055 A1 | 4/2009 | Caspi et al. |

(Continued)

FOREIGN PATENT DOCUMENTS

| | | |
|---|---|---|
| WO | 2005018190 A1 | 2/2005 |
| WO | 2016022588 A1 | 2/2016 |

OTHER PUBLICATIONS

IBM, "Voice Over IP Teleconferencing Arbitration Software to Prevent Loopback Echo", An IP.com Prior Art Database Technical Disclosure, Original Publication Date: Mar. 14, 2006, IP.com No. IPCOM000134654D, 2 pages.

(Continued)

*Primary Examiner* — Jakieda R Jackson
(74) *Attorney, Agent, or Firm* — Daniel R. Simek

(57) ABSTRACT

A method for identifying and managing users within a group during a teleconference. The method includes a computer processor determining that a group of users are sharing a first client device to communicate, via a teleconference with one or more other users. The method further includes identifying a first user, of the group of user that are sharing the first client device, that is speaking during a first portion of the teleconference. The method further includes determining an action corresponding to the first user, where an action affects managing content of the teleconference at a client device. The method further includes initiating the determined action corresponding to the first user.

18 Claims, 4 Drawing Sheets

(56) References Cited

U.S. PATENT DOCUMENTS

| | | | | |
|---|---|---|---|---|
| 2009/0097625 A1* | 4/2009 | Peters | ............... | H04M 3/56 |
| | | | | 379/158 |
| 2011/0292162 A1* | 12/2011 | Byun | ............... | H04N 7/147 |
| | | | | 348/14.08 |
| 2011/0295392 A1* | 12/2011 | Cunnington | ...... | G06Q 10/10 |
| | | | | 700/90 |
| 2012/0239400 A1* | 9/2012 | Koshinaka | ......... | G10L 17/16 |
| | | | | 704/249 |
| 2013/0144603 A1* | 6/2013 | Lord | ............ | H04L 12/1831 |
| | | | | 704/9 |
| 2013/0178959 A1* | 7/2013 | Hirsch | ............ | G06F 19/00 |
| | | | | 700/91 |
| 2013/0266127 A1* | 10/2013 | Schachter | ........... | G10L 25/48 |
| | | | | 379/88.01 |
| 2015/0179186 A1* | 6/2015 | Swierk | ............ | G06F 3/167 |
| | | | | 704/276 |
| 2015/0201162 A1 | 7/2015 | Griffin et al. | | |
| 2015/0255068 A1* | 9/2015 | Kim | .................. | G10L 17/04 |
| | | | | 704/246 |
| 2016/0117603 A1* | 4/2016 | Gaucher | ......... | G06N 99/005 |
| | | | | 706/12 |
| 2016/0203726 A1* | 7/2016 | Hibbs | ............. | G09B 7/02 |
| | | | | 434/308 |
| 2017/0154629 A1* | 6/2017 | Lu | ..................... | G10L 15/22 |

OTHER PUBLICATIONS

IBM, "Intelligent voice buffering for conference calls", An IP.com Prior Art Database Technical Disclosure, Original Publication Date: Jan. 7, 2009, IP.com No. IPCOM000177864D, 3 pages.

* cited by examiner

MANAGING USERS WITHIN A GROUP THAT SHARE A SINGLE TELECONFERENCING DEVICE

BACKGROUND OF THE INVENTION

The present invention relates generally to computer-based teleconferencing, and more particularly to identifying and managing users within a group that share a single teleconferencing device.

Businesses can utilize electronic meetings, such as teleconferences to communicate directly with multiple individuals, such as members of a business, suppliers, and representatives of a client dispersed across various geographical locations without incurring the time, the expense, and the disruption associated with travel for in-person interactions. One common meeting method is a teleconference utilizing audio communications over telecommunication systems. Advances in technology enable digital audio communication, such as Voice over Internet protocol (VoIP). VoIP is not limited to audio communication via a handset, VoIP can support audio obtained, for example from a microphone of a computer. Another teleconferencing technology includes a centralized source, such as a Multipoint Control Unit (MCU) that links multiple endpoint devices (e.g., teleconferencing devices) together. The MCU receives multimedia information streams (e.g., audio, video, and/or data) from multiple endpoint devices, processes the information streams, and retransmits the processed information streams to selected endpoints of a teleconference. To control, mix, and synchronize multimedia information streams from multiple endpoint devices, a MCU may utilize various telecommunication protocols, such as protocols that are that compliant with a H.323 standard.

Collaboration systems combine the use of video, audio, and on-screen drawing capabilities using various: desktop computing devices, mobile devices (e.g., laptop computers, smartphone, smart glasses and other wearable devices, etc.), and shared devices (e.g., digital projectors and digital whiteboards) to communicate over networks, and thus, enabling multi-party conferencing in real-time, independent of location. Teleconferencing and collaboration systems are not limited to a business environment. For example, news outlets, medicine, education, government, and non-profit organizations also benefit from teleconferencing.

SUMMARY

According to aspects of the present invention, there is a method, computer program product, and/or system for identifying and managing users within a group during a teleconference. In an embodiment, the method includes one or more computer processors determining that a group of users are sharing a first client device to communicate, via a teleconference with one or more other users. The method further includes identifying a first user, of the group of users that are sharing the first client device, that is speaking during a first portion of the teleconference. The method further includes determining an action corresponding to the first user, The method further includes determining an action corresponding to the first user, where an action affects managing content of the teleconference at a client device. The method further includes initiating the determined action corresponding to the first user.

DETAILED DESCRIPTION

Figure 1:
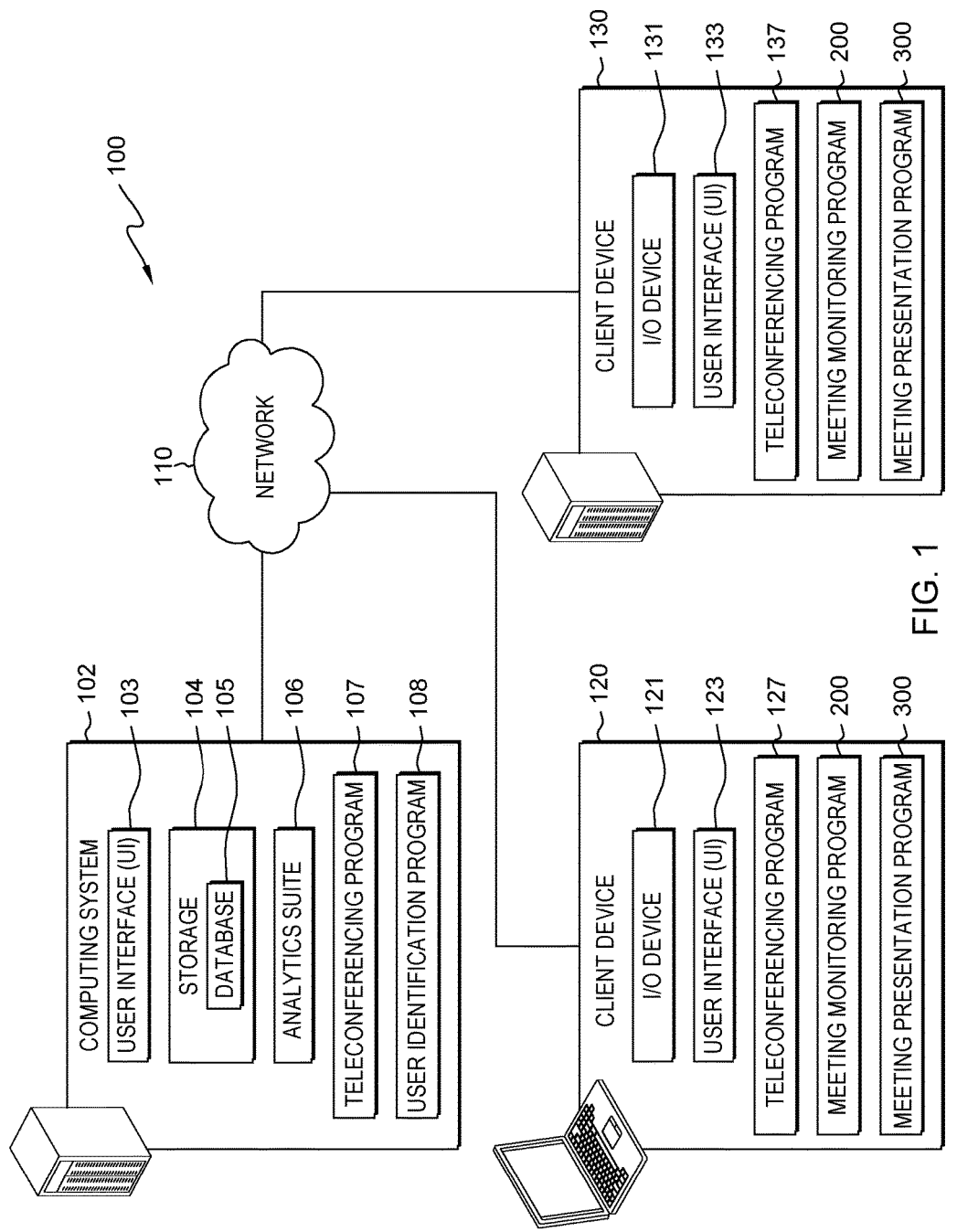
FIG. 1 illustrates a networked computing environment, in accordance with an embodiment of the present invention.

Embodiments of the present invention recognize that teleconferencing is utilized by various businesses and organizations to share information, establish goals, and distribute assignments. However, embodiments of the present invention also recognize that a group of users (i.e., participants) of a teleconference may attend the teleconference hosted in a room and participate via a shared electronic or computing device. The electronic and/or computing devices utilized for teleconferencing may be identified as endpoint devices. As such, other users at different endpoints may not recognize a participant of a teleconference that is speaking. In addition, a moderator may be required at each shared endpoint device, herein referred to as a client device, to: identify and add users to a list of participants, control the identification of each speaker, and designate a status of each user and/or speaker (e.g., a user that is talking or presenting). In addition, a moderator may be an individual that is skilled in operating audio/video equipment and a teleconferencing service. However, the moderator may not know the identities of each participant is a teleconference/video conference, herein referred to as a meeting.

Embodiments of the present invention recognize that various technologies are currently utilized to solution the problem of identifying speakers of a meeting, such as individualized: Bluetooth® devices, call buttons, radio-frequency identification (RFID) tags, badges that include quick response (QR) codes, etc. In addition, embodiments of the present invention recognize that a single user of a client device (e.g., endpoint device) may be identified based on the client device and/or the authentication used to connect to a teleconference or teleconferencing service. A meeting utilizing these technologies requires additional physical elements and preparation, and some technologies do not lend themselves to ad-hoc teleconferences.

Embodiments of the present invention utilize voice recognition and/or speaker recognition to identify users participating within a meeting, in particular identifying the users that are speaking (e.g., presenting information) during a meeting via a shared input device, such as a microphone. Based on information input by a moderator or within a predefined list, embodiments of the present invention automatically perform one or more actions (e.g., manages aspects of a meeting) in response to identifying a user that is speaking, such as mute/unmute, pause/resume, block/unblock, and/or connect/disconnect. In one example, a user that is not authorized to talk may be automatically muted without further intervention from a moderator. In another example, in response to identifying a user that is speaking the name of the user, the user is indicated (e.g., highlighted) within a list of users that are participating in the meeting. Also, additional information may be displayed or at least linked to a speaker, such as a job title, a department name/number, a company name, and contact information (e.g., one or more phone numbers, an e-mail address, a business address, a social media or social networking ID, etc.). Embodiments of the present invention are applicable to audio-only teleconferences, video conferencing, and mixed teleconferences. For example, in a mixed teleconference some participants are audio-only and other participants have access to video (e.g., audio and images).

Some embodiments of the present invention utilize various analytical and/or cognitive capabilities, such as natural language processing (NLP) to identify a user that is speaking. A further embodiment of the present invention utilizes digital-signal processing (DSP) to identify which users are speaking when two or more users are speaking concurrently (e.g., intermingled) while utilizing a shared client device. In addition, embodiments of the present invention can utilize speaker diarisation to partition/segment an input audio stream to isolate the dialog corresponding to each user that is speaking. By segmenting the audio (e.g., dialog) and identifying each user that is speaking, embodiments of the present invention can selectively respond to an action, such as a muting action that corresponds to each user.

Various embodiments of the present invention utilize a computing system, server, or cloud-based meeting function to host (e.g., manage) a meeting and thereby provide the capability to filter or delay the transmittal of content to one or more client devices. In addition, by utilizing a computing system, server, or cloud-based meeting function to host the meeting, embodiments of the present invention enable breakout meetings (e.g., child discussions) to dynamically occur during the meeting while maintaining the user identification and automated actions that are an aspect of the original meeting. In response to concluding a breakout meeting, users can rejoin the meeting in-progress. Alternatively, in response to the participants leaving the original meeting or the original meeting ending, the participants of one or more breakout meetings may receive various visual indications associated with the original meeting.

Further, one skilled in the art would recognize that communication of information and control of communication to a user is a function of many computing systems. By automating the detection and identification of users utilizing a shared input device at a meeting endpoint, the security of a computerized teleconferencing system is improved by reducing manual intervention by a moderator or a meeting and/or administrators of shared meeting endpoints. By utilizing biometric information, such as voiceprints to identify one or more users of a shared meeting endpoint security of a computerized teleconferencing system is also improved. In addition, the security of information communicated by a computerized teleconferencing system is further improved by including speech recognition that is associated with metadata triggers that can initiate and/or override one or more predefined actions associated with a user that speaks during a teleconference. As such, the functioning of such a computing system is seen to be improved in at least these aspects.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating networked computing environment 100 in an embodiment, in accordance with the present invention. An embodiment of networked computing environment 100 may include: computing system 102, client device 120, and client device 130 all interconnected over network 110. Networked computing environment 100 may include other instance of client devices (not shown) that are utilized as endpoints of a meeting. In addition, FIG. 1 includes a plurality of users (not shown) associated with the client devices of networked computing environment 100. Many modifications to the depicted environment may be made by those skilled in the art without departing from the scope of the invention as recited by the claims.

Computing system 102, client device 120, and client device 130 may be laptop computers, tablet computers, netbook computers, personal computers (PC), desktop computers, personal digital assistants (PDA), smartphones, wearable devices (e.g., digital eyeglasses, smart glasses, a smart watch), or any programmable computer systems known in the art. In certain embodiments, computing system 102, client device 120, and client device 130 represent computer systems utilizing clustered computers and components (e.g., database server computers, application server computers, etc.) that act as a single pool of seamless resources when accessed through network 110, as is common in data centers and with cloud-computing applications. In general, computing system 102, client device 120, and client device 130 are representative of any programmable electronic device or combination of programmable electronic devices capable of executing machine-readable program instructions and communicating with users of computing system 102, client device 120, and client device 130, via network 110. Computing system 102, client device 120, and client device 130 may include components, as depicted and described in further detail with respect to FIG. 4, in accordance with embodiments of the present invention.

Computing system 102 includes: user interface (UI) 103, storage 104, analytics suite 106, teleconferencing program 107, and user identification program 108. Computing system 102 may also include an instance of meeting monitoring program 200 and/or meeting presentation program 300. Computing system 102 also includes various programs and databases, such as an operating system, a website interface, presentation software, an e-mail client, a calendar program, etc., (not shown) within storage 104. In various embodiments, computing system 102 can access one or more programs, functions, and/or software services from another computing system (not shown) via network 110. In an example, computing system 102 accesses, via network 110, a cloud service provider that provides one or more communication services, such as video conferencing, and other software applications, such as a digital signal processing, analytics, and cognitive programs as a Software as a Service (SaaS) offering.

Storage 104 includes user information, user profiles, user preferences, metadata triggers, predefined responses, moderator defined actions for various users, moderator defined defaults for unidentified users, conference system setups, controls (e.g., phone numbers, access codes, hot-key combinations, etc.), and other information utilized by meeting monitoring program 200. Storage 104 may also include user/meeting preferences utilized by meeting presentation program 300, such as a rate of polling associated with the looping of an instance of meeting presentation program 300, for example, to identify changes of participants of a meeting (e.g., users that are present, a user that is speaking). In some scenarios, storage 104 includes meeting (e.g., moderator) preferences that may dictate which capabilities of analytics suite 106 are utilized for each meeting. In an example, a moderator of a meeting may dictate that teleconferencing program 107 accesses a multi-lingual translation program in response to meeting presentation program 300 identifying, based on user profiles, that one or more participants utilize different languages. In various scenarios, storage 104 also includes various programs and data, such as dictionaries, thesauruses, translations of different languages that are utilized during a teleconference. Alternatively, computing system 102 can access dictionaries, thesauruses, translations of different languages that are utilized during a teleconference via network 110.

Database 105 stores information, such as voiceprints (e.g., audio template, voice model, audio sample) of a plurality of users that are utilized to identify a user (e.g., participant within a group of users.) Voiceprints within database 105 are utilized by user identification program 108 to perform speaker recognition during a meeting. Database 105 may also include organizational information (e.g., names, departments, reporting structures, calendar entries, etc.) associated with meeting participants, and/or a list of expected participants based on a digital meeting invitation and/or acceptance responses associated with the meeting. In some embodiments, database 105 includes other information that is utilized to identify and/or verify a user, such as encoded information on a badge of a user and/or various biometric information of the user. In an alternative embodiment, database 105 includes: user profiles, user preferences, metadata triggers, predefined responses, moderator defined actions for various users, conference system setups, controls, polling rates, etc. previously discussed with respect to storage 104.

In addition, database 105 may include other biometric data to identify a participant of a meeting, such as one or more images of a participant that can be utilized if a voiceprint of the participant is not on file or in conjunction with a voiceprint to verify a user. In one embodiment, database 105 also includes authentication information utilized by teleconferencing program 107 to authenticate and link two or more client devices that act as interfaces for users that attend a teleconference (e.g., a meeting). In another embodiment, database 105 includes one or more actions that a moderator assigns to each participant associated with a meeting, such as mute/unmute, pause/resume, block/unblock, and/or connect/disconnect.

Analytics suite 106 includes a speech recognition program, one or more language translation programs, and an analytics program (e.g., NLP) that analyzes dialog (e.g., verbal, text-based, etc.) of a meeting communicated by network 110. In some embodiments, analytics suite 106 includes DSP software and various filtering algorithms and a speaker diarisation program to segment audio and identify user in response to multiple users speaking concurrently utilizing a shared I/O device, such as a microphone. In another embodiment, analytics suite 106 includes a gesture recognition program that can convert information input via sign-language to text.

Teleconferencing program 107 is a host version of a teleconferencing program that obtains content (e.g., audio, video, data) from at least once source, such as a first client device; and analyzes, manages, and distributes the content among other client devices linked within a meeting (e.g., teleconference). Teleconferencing program 107 may include Voice over Internet protocol (VoIP) software. Teleconferencing program 107 also receives other information, commands, and metadata that includes, but is not limited to: authenticating users/client devices, identifying users, identifying client devices (e.g., locations), responding to one or more moderators, mixing content from various sources, etc. Teleconferencing program 107 may include moderator functions, such as add a user, mute/unmute a user, mute/unmute a client device, etc.

In various embodiments, teleconferencing program 107 includes multi-modal communications, control, and analysis for client endpoints of varying capabilities. For example, teleconferencing program 107 supports teleconferencing between client endpoints, such as video conference rooms, analog/digital telephones, smart devices (e.g., smartphones), and computers with various peripherals (e.g., I/O devices). In some scenarios, teleconferencing program 107 utilizes instances of meeting monitoring program 200 and/or meeting presentation program 300 (not shown) within computing system 102 to monitor and control aspects of a teleconference and distribute such to meeting endpoints (e.g., client devices) that do not support instances of meeting monitoring program 200 and/or meeting presentation program 300, such as an analog telephone.

In some embodiments, teleconferencing program 107 responds to commands and utilizes information from one or more programs. In an example, teleconferencing program 107 receives information from a voice recognition program that identifies a user that is speaking without input from a moderator. In other embodiments, teleconferencing program 107 provides a small delay between receiving content from a client device and transmitting the content to other teleconferencing endpoints (e.g., client devices). Teleconferencing program 107 utilizes delays to obtain additional portions of a teleconference from the same endpoint to more efficiently integrate the different received portions of content to improve the flow and presentation of content within the teleconference.

User identification program 108 identifies users that attend a meeting. In one embodiment, user identification program 108 interfaces with teleconferencing program 107 to monitor the communication between various client devices and identify users. In one embodiment, user identification program 108 utilizes voiceprints, voice model, and/or audio samples of a plurality of user that are stored within database 105 to identify a user. In another embodiment, user identification program 108 compares a spoken name associated with a user to a voiceprint corresponding to a user name to verify that the user that speaks is the user of the voiceprint corresponding to the user name. In various embodiments, user identification program 108 identifies or verifies a user based on additional information, such as scanning a badge of a user and speaking and/or utilizing other biometric data, such as a fingerprint.

In a further embodiment, user identification program 108 utilizes one or more aspects of analytics suite 106. In one example, user identification program 108 utilizes a DSP program within analytics suite 106 to segment and isolate multiple users within an audio stream and subsequently identify the users that are speaking. In another example, user identification program 108 utilizes a gesture recognition program and an image processing program, such as a facial recognition program within analytics suite 106 to identify a user based on sign language and the face of the user that is utilizing sign language (e.g., speaking) to communicate.

In one embodiment, computing system 102, client device 120 and client device 130 communicate through network 110. Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between computing system 102, client device 120, and client device 130, in accordance with embodiments of the present invention. In another embodiment, network 110 operates locally via wired, wireless, or optical connections and can be any combination of connections and protocols (e.g., near field communication (NFC), laser, infrared, etc.).

In one embodiment, UI 103, UI 123, and UI 133 may be graphical user interfaces (GUIs) or web user interfaces (WUIs), and UI 103, UI 123, and UI 133 can display text, documents, spreadsheets, graphs, user options, application interfaces, and instructions for operation. In some embodiments, UI 123 and UI 133 can interface with respective teleconferencing programs 127 and 137 that present content of a meeting, such as audio, video, and/or data to one or more users associated with client device 120 and client device 130, respectively. UI 103 may represent the host interface for teleconferencing program 107, such as an interface utilized by a moderator of a meeting. In various embodiments, UI 123 and UI 133 display one or more icons representing applications that a user can execute via network 110, such as respective instances of meeting presentation program 300. In addition, UI 123 and UI 133 can control sequences of actions that one or more users (e.g., participants) utilize to respond and/or to interface with meeting monitoring program 200 and/or meeting presentation program 300.

In some embodiments, one or more users of client device 120 can interact with UI 123 via a singular device, such as a touch screen (e.g., display) that performs both input to a GUI/WUI, and as an output device (e.g., a display) presenting a plurality of icons associated with apps and/or images depicting one or more executing applications. In other embodiments, an application (e.g., a web browser) can generate UI 123 operating within the GUI environment of client device 120. A user (e.g., moderator) utilizing computing system 102 may interact with one or more programs and/or perform various actions via UI 103. Similarly, one or more users can utilize UI 133 to interact with one or more programs and/or perform various actions associated with client device 130.

UI 103, UI 123, and UI 133 accept input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, a peripheral (e.g., I/O device 121, I/O device 131), such as a cyberglove, may provide haptic feedback to a user, and may be included in client device 120 and/or client device 130. An I/O device interfacing with UI 103, UI 123, and 133 may be respectively connected to computing system 102, client device 120, and client device 130 which may operate utilizing wired (e.g., USB port) or wireless network communications (e.g., infrared, NFC, etc.). Examples of I/O devices that may be peripherals are: a keyboard, a mouse, a trackball, and a click wheel that provide input from a user. In an example, a user of client device 120 may utilize UI 123 to interact with teleconferencing program 127, meeting monitoring program 200, and/or meeting presentation program 300. In various embodiments, a respective UI may receive input in response to a user of computing system 102, client device 120, and/or client device 130 utilizing natural language, such as written words or spoken words, that computing system 102, client device 120, and/or client device 130 identifies as information and/or commands.

Client device 120 and 130 are computing devices that can be configured to be endpoints of a teleconference (e.g., meeting). Client devices 120 and 130 include respective instances of I/O device 121 and I/O device 131. Each instance of a client device may have a different number of I/O devices and may also include different I/O devices. In one example, client device 120 may be a laptop computer that includes an embedded webcam and microphone. In another example, client device 130 may be a desktop computer where each communication function utilized during a meeting is associated with a different peripheral (e.g., I/O device).

In one embodiment, client devices 120 and 130 each include respective instances of: a user interface, such as UI 123 and UI 133; teleconferencing program 127 and 137, meeting monitoring program 200, and meeting presentation program 300. Client device 120 and/or client device 130 may also include various programs and data, such as a website interface, presentation software, a voice recognition program, Voice over Internet protocol (VoIP) software, a calendar program, etc. (not shown). In various embodiments, client device 120 and/or client device 130 can access one or more programs, functions, and/or software services from another computing system (not shown) via network 110. In one example, computing system 102 accesses, via network 110, a cloud service provider (not shown) that provides one or more communication services, and other software applications, such as a digital signal processing program, or a speech translation program as a Software as a Service (SaaS) offering.

In another embodiment, an instance of client device 120 and/or an instance of client device 130 is representative of a telecommunication device, such as a telephone. Based on the capabilities of the telephone, an instance of client device 120 and/or an instance of client device 130 may or may not include some of all the features of instances of client device 120 and/or an instance of client device 130 that are computer enabled. In some scenarios, an instance of client device 120 and/or an instance of client device 130 are telephones that include one or more speakers to reproduce audio signals (e.g., sounds, conversations) and a respective I/O device 121 and/or I/O device 131, a microphone. Some instances of client device 120 and/or client device 130 that are telephones may not include software, such as a teleconferencing program and respective instances of meeting monitoring program 200 and meeting presentation program 300.

As such, instances of client device 120 and/or client device 130 that are telephones may rely on computing system 102 to include instances of meeting monitoring program 200 and meeting presentation program 300. Computing system 102 is utilized to identify users sharing a client device that is a telephone perform one or more actions associated with a user that speaks either at a client device that is a telephone to control the presentation of the teleconference from another client device to the client device that is the telephone. Alternatively, in other scenarios, an instance of client device 120 and/or an instance of client device 130 is representative of a telecommunication device, such as a smartphone that includes various computer capabilities and supports the execution of software, such as respective instances a teleconferencing program, meeting monitoring program 200 and meeting presentation program 300.

In various embodiments, an instance of client device 120 and client device 130 occur at the same meeting endpoint. For example, an instance of client device 120 may be a computer without audio capabilities; however, client device 120 is utilized for at least UI 123 and may also display video portions of the teleconference. In this example, client device 130 may be a telephone that is synced to a communication network associated with computing system 102 that hosts a multi-modal version of teleconferencing program 107 that can process both analog and digital communications originating from various meeting endpoints.

In one embodiment, I/O device 121 and I/O device 131 are electronic interface devices (e.g., electronic equipment) that can respectively connect to client device 120 and client device 130. In another embodiment, I/O device 121 and/or I/O device 131 are electronic interface devices within respective proximities of client device 120 and client device 130 and connect to network 110. In various embodiments, I/O devices 121 and 131 are utilized for audio capture. I/O devices 121 and/or 131 may be representative of a microphone or a device that includes a microphone, such as a handset of a telephone or video camera. In addition, I/O devices 121 and 131 may include, but are not limited to: digital whiteboards, digital projectors, and video cameras. In some embodiments, two or more I/O devices are associated with a client device. In an example, client device 120 includes a first instance of I/O device 121 that is a digital projector to present a meeting to a large group of users and a second instance of I/O device 121 that is a video camera with a microphone to transmit video as well as audio of the large group of users. I/O devices 121 and 131 may include components, as depicted and described in further detail with respect to FIG. 4, in accordance with embodiments of the present invention.

Teleconferencing programs 127 and 137 are client versions of a teleconferencing program that obtains content (e.g., audio, video, data) respectively from client device 120 and client device 130 and communicates, via network 110, the respectively obtained content to teleconferencing program 107 of computing system 102. In various embodiments, teleconferencing programs 127 and 137 includes respective instances of UI 123 and UI 133.

In some embodiments, teleconferencing programs 127 and 137 utilize a real-time transport protocol (RTP) that further includes synchronization source identifiers (SSRC's) that uniquely identify a source of a stream of information and contributing source IDs (CSRC's) that enumerate contributing sources (e.g., users and meeting participants) to a stream of information of a meeting. Teleconferencing programs 127 and 137 may include Voice over Internet protocol (VoIP) software. Teleconferencing programs 127 and 137 also receives other information, commands, and metadata that includes, but is not limited to: authenticating users/client devices, identifying users, and/or responding to commands received from one or more moderators.

In other embodiments, teleconferencing programs 127 and 137 respond to commands and utilize information from one or more programs. In one example, teleconferencing program 127 receives information from a voice recognition program (not shown) associated with a client device that identifies a user that is speaking without input from a moderator. In another example, teleconferencing programs 127 and 137 process content of a meeting associated with respective instances of meeting monitoring program 200 and/or interface with respective instances of meeting presentation program 300 to present content of the meeting utilizing a client device. In a further embodiment, teleconferencing programs 127 and/or 137 include and/or utilize an NLP program to process more sophisticated actions and/or gesture recognition to process communications from a user that utilizes sign language.

Meeting monitoring program 200 is a program to identify a plurality of users that share a client device to participate in a meeting. Meeting monitoring program 200 may utilize one or more 110 devices of a client device to identify a user of a shared client device and to record/transmit a portion of the meeting that originates from the shared client device. In addition, meeting monitoring program 200 identifies a user that is speaking or communicating via another method (e.g., sign language, a text to speech device, etc.) by utilizing audio and/or visual information. In one embodiment, meeting monitoring program 200 utilizes voice recognition software (not shown) within a client device to identify a user, and more in particular a user that speaks during a meeting. In another embodiment, meeting monitoring program 200 utilizes, via network 110, user identification program 108 of computing system 102 to identify a user associated with a meeting. In another embodiment, meeting monitoring program 200 identifies one or more actions, assigned by a moderator, that are associated with one or more users. In response to meeting monitoring program 200 determining that the identity of the user that speaks, meeting monitoring program 200 initiates at least one action within a respective client device.

In various embodiments, meeting monitoring program 200 determines that actions assigned to each user (e.g., participant) of a meeting can vary from meeting to meeting. In some scenarios, meeting monitoring program 200 utilizes actions and/or keyword triggers assigned/associated with each of a meeting may be included within database 105. In other scenarios, meeting monitoring program 200 utilizes actions and/or keyword triggers assigned/associated with each of a meeting based on information and/or metadata related to each meeting. In various scenarios, meeting monitoring program 200 utilizes actions and/or keyword triggers assigned/associated with a user of a meeting that are dynamically updated during the meeting.

In some embodiments, an instance meeting monitoring program 200 utilizes a respective instance of a teleconferencing program, such as teleconferencing program 127 of client device 120 to interface with teleconferencing program 107 of computing system 102 as opposed to directly interfacing with teleconferencing program 107. In other embodiments, meeting monitoring program 200 embeds information, such as timestamps, the identities that correspond to users that share a client device within a stream of audio data and content associated with a meeting transmitted by a client device for processing by teleconferencing program 107 of computing system 102. Meeting monitoring program 200 may also include at least one action associated with a user within the information stream transmitted by a client device to computing system 102, in response to meeting monitoring program 200 determining the identity of each user that speaks. In one example, meeting monitoring program 200 determines the identity of each user that speaks and embeds one or more corresponding actions within a transmitted information stream. Subsequently, the one or more embedded actions are processed by an instance of meeting presentation program 300 at each client device associated with the meeting. Alternatively, meeting monitoring program 200 may respond to an action corresponding to a user, such as mute by blocking content, associated with a specific user of client device 120, from being transmitted to computing system 102. Thus, the content of the user is not only blocked from the one or more users associated with client device 130, but the content is not available for teleconferencing program 107 of computing system 102 to include within a transcript of the meeting.

Meeting presentation program 300 is a program for presenting one or more aspects of a teleconference via a client device based on an action associated with a user of a group of users that share another client device. In one embodiment, each client device associated with a meeting executes an instance of meeting presentation program 300. Instances of meeting presentation program 300 receive content, processed by teleconferencing program 107 of computing system 102, from one or more instances of meeting monitoring program 200 on other client devices that are participating in a meeting. In addition to content, meeting presentation program 300 receives embedded information within a stream of information associated with a meeting, such as an ID of a client device and an identity of a speaker and one or more commands corresponding to the speaker, such as mute.

In a further embodiment, instances of meeting presentation program 300 executing within different client devices can receive different content from teleconferencing program 107 or initiate one or more different actions based on the location of each client device associated with a meeting. In an example, one instance of meeting presentation program 300 may execute an action to mute a portion of the meeting in response to determining that one client device is located at a site of a customer, while another instance of meeting presentation program 300 does not mute the same portion of the meeting in response to determining that another client device is associated with the company that initiated the meeting.

An instance of meeting presentation program 300 can execute concurrently with an instance of meeting monitoring program 200 within the same computing device. In some embodiments, an instance meeting presentation program 300 utilizes a respective instance of a teleconferencing program, such as teleconferencing program 127 of client device 120 to interface with teleconferencing program 107 of computing system 102 as opposed to directly interfacing with teleconferencing program 107. In other embodiments, computing system 102 includes a server and/or moderator version of meeting presentation program 300.

Figure 2:
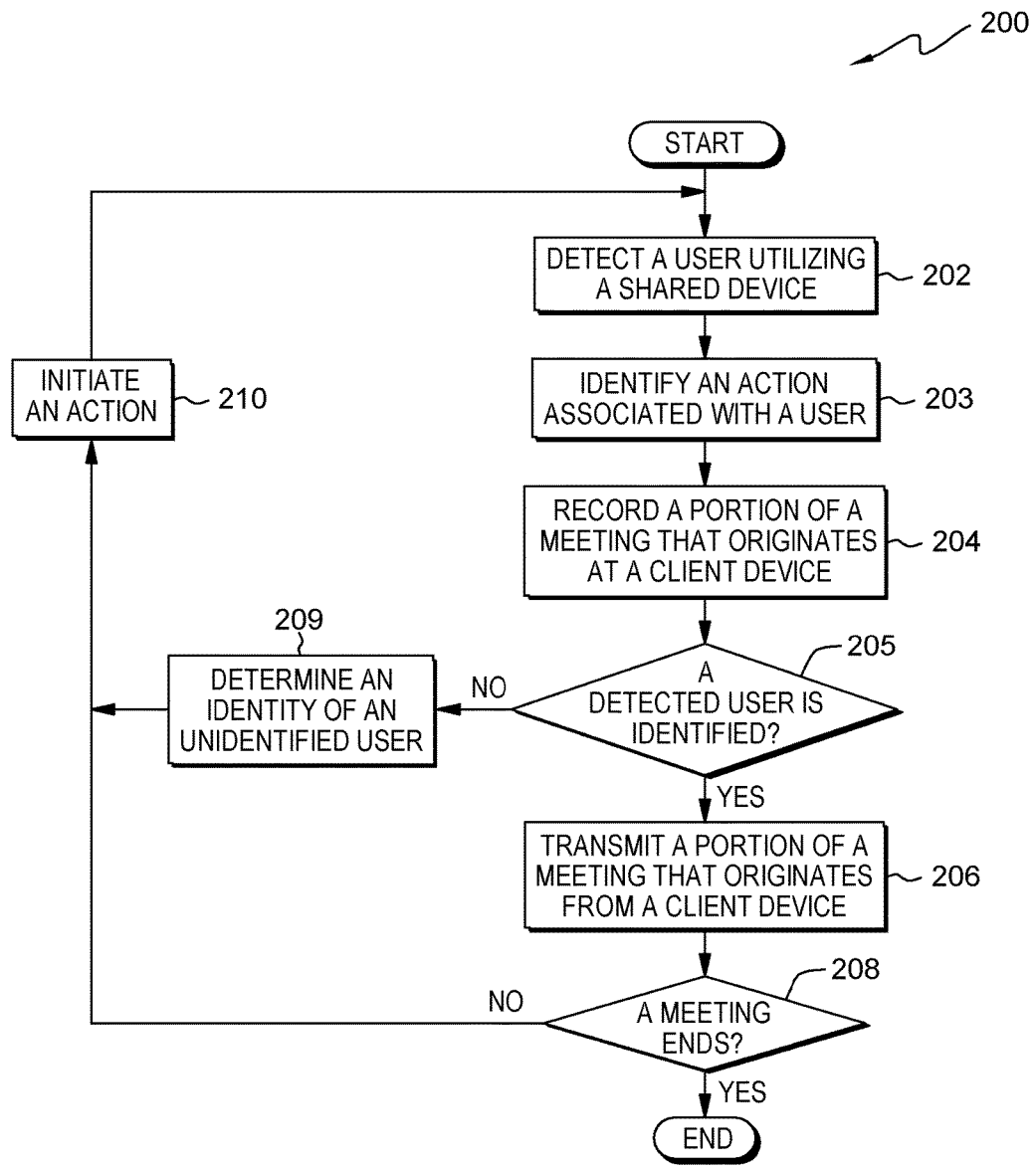
FIG. 2 depicts a flowchart of the operational steps of a meeting monitoring program, in accordance with an embodiment of the present invention.

FIG. 2 is a flowchart depicting operational steps for meeting monitoring program 200, a program that determines the identities of one or more users that share a meeting endpoint (i.e., a client device), and embeds the information within an information stream that originates from the meeting endpoint, in accordance with embodiments of the present invention. Meeting monitoring program 200 may utilize one or more I/O devices of a client device to identify a user of a shared client device and to record/transmit a portion of the meeting that originates from the shared client device. In addition, meeting monitoring program 200 initiates one or more actions based on the identity of a user or the lack of identity of a user in response to a user speaking.

In an alternative embodiment, meeting monitoring program 200 does not execute or meeting monitoring program 200 terminates in response to determining that a single user utilizes a client device to attend a meeting. A single user of a client device may participate in meeting utilizing a client-version of a teleconferencing program. However, meeting presentation program 300 may execute if another instance of meeting monitoring program 200 determines that there is at least one client device shared by multiple users.

In step 202, meeting monitoring program 200 detects a user utilizing a shared device. Meeting monitoring program 200 may utilize one or more I/O devices to monitor a meeting and detect (e.g., obtain an audio sample) a user that speaks utilizing a shared I/O device, such as a microphone. In one embodiment, meeting monitoring program 200 also identifies the user that is speaking via a shared client device (e.g., meeting endpoint) utilizing voice recognition. In one scenario, meeting monitoring program 200 transmits a sample of the voice of a user to user identification program 108 of computing system 102 to determine the identity of the user (e.g., speaker). Meeting monitoring program 200 receives a response from user identification program 108 based on voiceprints stored within database 105. In another scenario, meeting monitoring program 200 determines the identity of a user based on a voiceprint of the user stored on the client device that the user utilizes for the meeting.

In some embodiments, meeting monitoring program 200 detects a user utilizing a shared device but cannot identify the user of the shared device. In an example, meeting monitoring program 200 receives a response from user identification program 108 indicating a voiceprint of the detected user is not included within database 105 of computing system 102. In response to not identifying a user of a shared device, meeting monitoring program 200 flags the unidentified user to one or more authorized individuals, such as a moderator of the meeting and/or an administrator of a client device.

In a further embodiment, meeting monitoring program 200 detects that two or more users are speaking within proximity of an I/O device of the same client device. In response to meeting monitoring program 200 detecting that two or more users are speaking utilizing a shared device, meeting monitoring program 200 may communicate with computing system 102 and utilize one or more aspects of analytics suite 106 to determine which users are speaking. In an example, meeting monitoring program 200 may utilize a DSP program and user identification program 108 to identify which users are speaking when two or more users are speaking concurrently while utilizing a shared client device. In addition, monitoring program 200 can utilize speaker diarisation to partition/segment an audio stream and isolate the speech corresponding to each user that is speaking utilizing a shared device.

Still referring to step 202 in various embodiments, in response to looping via Step 210, meeting monitoring program 200 detects a change related to which one or more users are speaking via the shared device.

In step 203, meeting monitoring program 200 identifies an action associated with a user. Actions associated with a user may execute within a local client device and/or may be routed by teleconferencing program 107 of computing system 102 to one or more other client devices. In one embodiment, meeting monitoring program 200 identifies an action associated with a user based receiving on one or more inputs by a moderator. In another embodiment, meeting monitoring program 200 identifies an action associated with a user based on retrieving predefined information related to the user stored within database 105 of computing system 102. In addition, meeting monitoring program 200 may identify one or more actions and/or keywords associated with a user based on retrieving predefined information related to the user stored within storage 104. In an example, meeting monitoring program 200 may identify actions such as, such as mute/unmute, pause/resume, and/or block/unblock that are associated with a user. In various embodiments, meeting monitoring program 200 identifies an action associated with an identified user that affects the transmission of a portion of a meeting that originates from the shared client device (discussed in further detail with respect to step 206).

In some embodiments, meeting monitoring program 200 determines that one or more identified actions associated with a user change during the meeting. In one example, meeting monitoring program 200 determines that while a manager of the user is present, the user may speak on any topic without filtering (e.g., muting). In another example, if meeting monitoring program 200 determining that users from an outside organization join the meeting, then meeting monitoring program 200 places a block on information from one or more users (e.g., speakers) at various meeting endpoints, such as for the purposes of security. In a further embodiment, meeting monitoring program 200 utilizes a NLP program to identify keywords within the audio stream of a user and apply one or more alternative actions. In an example, meeting monitoring program 200 determines that a user can speak on various topics without being muted; however, meeting monitoring program 200 mutes the user in response to monetary keywords, such as dollars, cost, interest rates, etc.

In step 204, meeting monitoring program 200 records a portion of a meeting that originates at a client device. In one embodiment, meeting monitoring program 200 utilizes one I/O device of a client device to record a portion of the meeting that originates at the shared client device, such as a microphone at the front of a meeting room or a microphone passed around among participants in a room. In another embodiment, meeting monitoring program 200 utilizes two or more I/O devices of a client device to record a portion of the meeting that originates at the shared client device, such as a smartphone passed among students engaged in a video chat with various members of the families of the users. In some embodiments, meeting monitoring program 200 utilizes aspects of a local instance of a teleconferencing program of a shared client device, such as teleconferencing program 137 of client device 130 to record a portion of the meeting that originates at the shared client device.

In decision step 205, meeting monitoring program 200 determines whether a detected user is identified. In response to determining that a detected user is identified (Yes branch, decision step 205), meeting monitoring program 200 transmits a portion of a meeting that originates from a client device (step 206).

In step 206, meeting monitoring program 200 transmits a portion of a meeting that originates from a client device. In one embodiment, meeting monitoring program 200 transmits a portion of a meeting that originates from a client device to computing system 102 via network 110. In addition, meeting monitoring program 200 may embed one or more actions associated with each user that speaks during the portion of the meeting transmitted from the client device. In another embodiment, meeting monitoring program 200 utilizes an instance of a teleconferencing program of the client device to transmit a portion of a meeting that originates from the client device to computing system 102. In addition, meeting monitoring program 200 communicates the one or more actions associated with each user speaking during the portion of the meeting that originates at a shared client device to the instance of a teleconferencing program of the client device.

Subsequently, the client device transmits information stream of the meeting and one or more actions associated with each speaker to computing system 102 for processing by teleconferencing program 107. In an example, meeting monitoring program 200 utilizes an H.323 compliant RTP to communicate between client device 120 and computer system 102. Each identified speaker utilizing client device 120 is assigned a CSRC identifier and actions associated with the user at any point in time during the meeting may be included within one or more RTP packets transmitted to computing system 102 for processing by teleconferencing program 107.

In an alternative embodiment, based on one or more actions and/or keyword triggers of an identified user, meeting monitoring program 200 may not transmit (e.g., withholds) a portion of the meeting that originates from the client device. In an example, meeting monitoring program 200 may identify a user; however, meeting monitoring program 200 determines that the identified user is not invited to the meeting and blocks the transmission of a portion of the meeting associated with the uninvited user speaking. In some scenarios, meeting monitoring program 200 may delay transmitting a portion of a meeting that originates from a client device until one or more conditions are met and/or one or more commands are input with respect to initiating an action in step 210.

In an example, if meeting monitoring program 200 determines that two users of a shared device are speaking together (e.g., intermingled, concurrently, at the same time); however, one user is not identified, then meeting monitoring program 200 delays transmitting the portion of the meeting associated with the unidentified speaker. Meeting monitoring program 200 delays the transmission of the portion of the meeting associated with the unidentified speaker (i.e., user) until the unidentified speaker is identified and one or more actions/keywords is determined for the subsequently identified speaker. In response, meeting monitoring program 200 can initiate transmitting the delayed portion in step 210.

In decision step 208, meeting monitoring program 200 determines whether a meeting ends. In one embodiment, meeting monitoring program 200 determines that a meeting ends based on teleconferencing program 107 indicating that the meeting ends. In another embodiment, meeting monitoring program 200 determines that a meeting ends based on utilizing a UI of a client device to terminate (e.g., sign off) of the teleconferencing program of the client device. In some embodiments, meeting monitoring program 200 determines that a meeting ends based on one or more commands submitted by a moderator of the meeting, such as via UI 103 of computing system 102.

In other embodiments, meeting monitoring program 200 determines that a meeting ends based on other client devices ceasing communications with teleconferencing program 107. In a further embodiment, meeting monitoring program 200 determines that a related meeting ends. In one scenario, meeting monitoring program 200 determines that a primary (e.g., parent) meeting ends; however, one or more breakout (e.g., child) meetings continue. In another scenario, meeting monitoring program 200 determines that one or more breakout meetings end; however, the primary (e.g., parent) meeting continues.

In response to determining that a meeting ends (Yes branch, decision step 208), meeting monitoring program 200 terminates. In one embodiment, each instance of meeting monitoring program 200 terminates in response to a meeting that ends, such as the meeting is concluded by the moderator. In another embodiment, meeting monitoring program 200 terminates based on receiving input from a user of a client device via a UI of the client device.

Referring to decision step 205, responsive to determining that a detected user is not identified (No branch, decision step 205), meeting monitoring program 200 determines an identity of an unidentified user (step 209).

In step 209, meeting monitoring program 200 determines an identity of an unidentified user. In one embodiment, meeting monitoring program 200 identifies a user utilizing a shared device utilizing one or more I/O devices of the shared client device. Meeting monitoring program 200 may identify an unidentified user based on: other biometric data, such as facial recognition, fingerprint analysis; input from a moderator of the meeting; a name processed via NLP; an ID badge; etc. In another embodiment, meeting monitoring program 200 determines an identity of an unidentified user based on input from an administrator (e.g., an authorized user) of the client device, such as inputting the name of the unidentified user via a UI of the shared client device. In some embodiments, meeting monitoring program 200 determines an identity of an unidentified user based on importing a copy of a voiceprint and/or other biometric data of the unidentified to one or more databases, such as database 105 and verifying the identity of the user.

Referring to decision step 208, in response to determining that a meeting does not end (No branch, decision step 208), meeting monitoring program 200 initiates an action (step 210).

In step 210, meeting monitoring program 200 initiates an action. In one embodiment, in response to meeting monitoring program 200 identifying an unidentified user, meeting monitoring program 200 transmits the voiceprint and/or other biometric data to computing system 102 for inclusion (e.g., storage) within database 105. In one scenario, in addition to storing a copy of a voiceprint and/or other biometric data within database 105, meeting monitoring program 200 also transmits one or more actions associated with the identified user to computing system 102. The one or more actions and/or keyword triggers may be assigned by an administrator of the client device. In another scenario, a moderator of the meeting updates database 105 with one or more actions assigned to the identified user. In one example, a moderator of a meeting by utilizes UI 103, of computing system 102, to update the actions assigned to a user that was previously unidentified. In another example, an administrator (e.g., authorized user) of an endpoint of the meeting, via a different client device, utilizes a respective instance of meeting monitoring program 200 and a UI of the different client device to update database 105 with one or more actions and/or keyword triggers associated with the user.

In some embodiments, based on the one or more actions and/or keyword triggers associated with the identified user (step 209), meeting monitoring program 200 may or may not transmit (e.g., withholds) a portion of the meeting that originates from the client device. In one example, meeting monitoring program 200 may identify a user; however, meeting monitoring program 200 determines that the identified user does not have clearance to speak during the meeting and in response, meeting monitoring program 200 blocks the transmission of a portion of the meeting associated with the speaker that does not have clearance. In another example, meeting monitoring program 200 utilizes an instance of a UI to present a selection of actions associated with a user to a moderator/administrator of a client device, such as selectively unmuting a user, muting the client device for all user, identifying that a speaker/user changes topics (e.g., affected by one or more other assigned actions), or initiating a breakout meeting. In another example, meeting monitoring program 200 initiates one or more default actions in response to a speaker that is not or cannot not be identified.

Still referring to step 210 in another embodiment, meeting monitoring program 200 initiates an action in response to a determination that a meeting does not end (No branch, decision step 208). In one scenario, if no additional actions are associated with the meeting at the current time, then meeting monitoring program skips Step 210 and loops to Step 202 to determine which user of a shared device is speaking. In another scenario, meeting monitoring program 200 initiates an action associated with an identified user. In another scenario, meeting monitoring program 200 initiates an action associated with a delayed transmission of the portion of the meeting associated with one or more identified users and at least one unidentified user that whose speaking is intermingled. In some embodiments, meeting monitoring program 200 utilizes a local instance of a teleconferencing program, such as teleconferencing program 137 of client device 130, to initiated one or more actions.

Subsequently, meeting monitoring program 200 loops to step 202 to determine which user of the shared device is speaking during the meeting.

Referring to decision step 208, responsive to determining that a meeting ends (Yes branch, decision step 208), meeting monitoring program 200 terminates.

Figure 3:
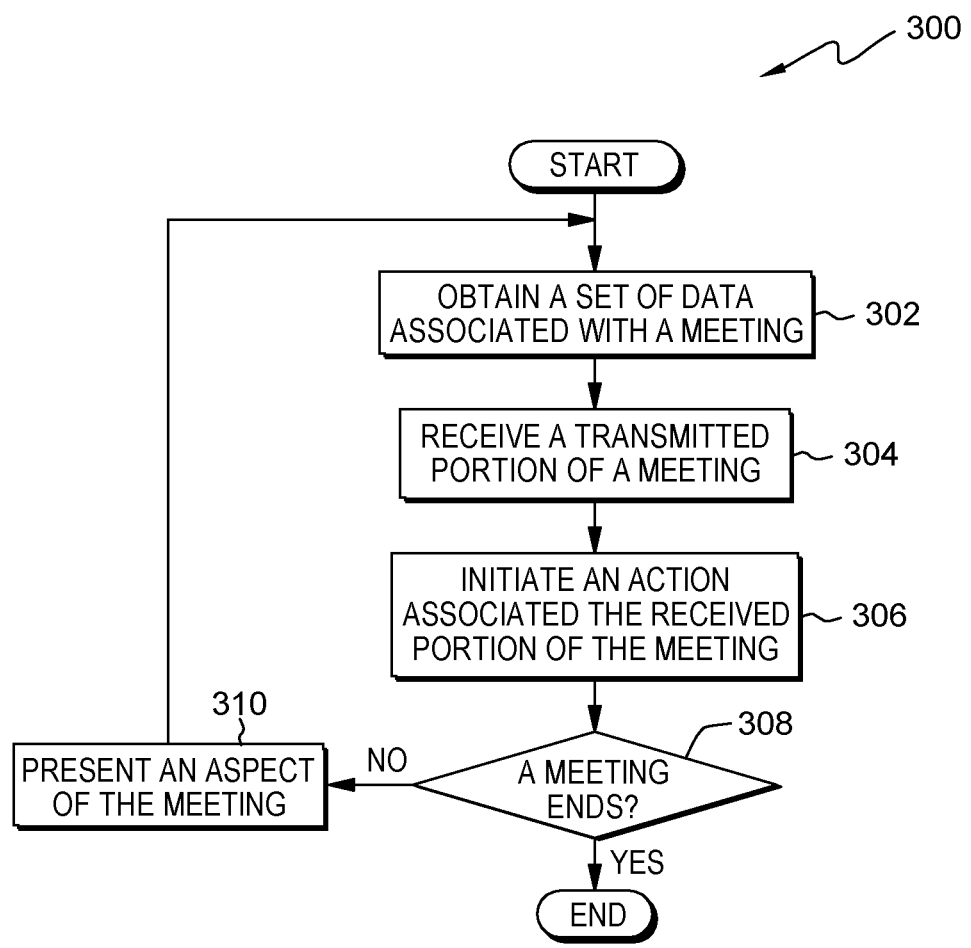
FIG. 3 depicts a flowchart of the operational steps of a meeting presentation program, in accordance with an embodiment of the present invention.

FIG. 3 is a flowchart depicting operational steps for meeting presentation program 300, a program for presenting one or more aspects of a teleconference at a client device based on an action associated with a user, within a group of users sharing another client device, in accordance with embodiments of the present invention. In one embodiment, each client device associated with a meeting executes an instance of meeting presentation program 300. In some embodiments, computing system 102 includes a server and/or moderator version of meeting presentation program 300. Instances of meeting presentation program 300 communicate with one or more instances of meeting monitoring program 200 on client devices via respective client-versions of a teleconferencing program and interfacing with a host-version of the teleconferencing program executing within computing system 102. In some embodiments, meeting presentation program 300 can monitor and interact with two or more related meetings, such as a parent meeting and a breakout meeting of users associated with the parent meeting.

In step 302, meeting presentation program 300 obtains a set of data associated with a meeting. A set of data associated with a meeting may include a client device ID (e.g., a name, a location, etc.) and a list of users (i.e., participants). In one embodiment, meeting presentation program 300 obtains a set of data associated with a meeting based on data received from another computing system, such as computing system 102 that host a meeting or another computing device (not shown) that schedules the meeting. In another embodiment, meeting presentation program 300 obtains (e.g., receives) multiple sets of data associated with a meeting. In an example, in response to a client device connecting to computing system 102 for a meeting, a local instance of meeting presentation program 300 receives a set of data associated with each of the other client devices connected to the meeting.

In some embodiments, meeting presentation program 300 obtains a set of data for the original meeting and each breakout meeting. Alternatively, meeting presentation program 300 obtains a set of data used to setup a breakout meeting utilizing a client device. In various embodiments, meeting presentation program 300 receives a set of data associated with a portion of the meeting, such as the identity of a user that is speaking, an action to initiate that is associated with a user, and a location associated with the user that is speaking. In other embodiments, meeting presentation program 300 obtains dynamic updates from instances of meeting monitoring program 200 and/or a teleconferencing program of respective client devices as the users at each client device change, both attendees and speakers. In an example, meeting presentation program 300 obtains a set of information that identifies each user attending the teleconference from each client device.

In step 304, meeting presentation program 300 receives a transmitted portion meeting. In one embodiment, each instance of meeting presentation program 300 receives the same portion of a meeting via network 110 transmitted by an instance of meeting monitoring program 200 for processing by teleconferencing program 107 of computing system 102. In another embodiment, an instance meeting presentation program 300 receives a portion of a meeting, processed by teleconferencing program 107, that is associated with two or more client devices and corresponding users that convene a temporary breakout meeting (e.g., a child discussion) prior to reconsolidating with the primary meeting (e.g., the parent discussion). In some embodiments, an instance of meeting presentation program 300 associated with a parent meeting receives information but not content of a breakout meeting, such as a list of client devices and corresponds user of each client device of the breakout meeting, and an indication/status of users (e.g., attendees and speakers), of each client device participating in a breakout meeting.

In other embodiments, an instance of meeting presentation program 300 does not receive a portion of a meeting. In one scenario, an instance of meeting presentation program 300 does not receive a portion of a meeting based on computing system 102 filtering (e.g., not transmitting) the portion of the meeting, transmitted by an instance of meeting monitoring program 200, based on moderator dictates and/or one or more actions associated with a user that speaks at a client device. In another scenario, one instance of meeting presentation program 300 does not receive a portion of a meeting based on computing system 102 based on computing system 102 hosting a temporary breakout meeting among two or more other client devices corresponding users. However, other instances of meeting presentation program 300 corresponding to the breakout meeting receive one or more portions of the breakout meeting based on the users associated with each client device participating in the breakout meeting.

In step 306, meeting presentation program 300 initiates an action associated with the received portion of the meeting. Actions initiated by meeting presentation program 300 may include, but are not limited to: muting a user, updating a list of participants associated with one or more client devices, freezing and/or blocking a video component of a portion of the meeting. In one embodiment, meeting monitoring program 300 initiates an action that is related to a user that is speaking within the received portion of the meeting. In another embodiment, meeting presentation program 300 initiates an action associated with the received portion of the meeting based on a set of data associated with the meeting, such as a set of data (e.g., actions, keywords, etc.) associated with users that is stored within database 105.

In some embodiments, meeting presentation program 300 initiates an action associated with the received portion of the meeting, based on one or more actions of a moderator of the teleconference (e.g., utilizing computing system 102) and/or an administrator of the client device that receives a portion of the meeting. In other embodiments, meeting presentation program 300 initiates an action associated with the received portion of the meeting, such as reconfiguring a UI of the respective client device to host a breakout meeting. For example, meeting presentation program 300 suspends activity within an instance of a UI associated with the parent meeting, and opens and configures another instance of the UI for the breakout meeting.

In decision step 308, meeting presentation program 300 determines whether meeting ends. In one embodiment, meeting presentation program 300 determines that a meeting ends based on information received from teleconferencing program 107 executing within computing system 102. In another embodiment, meeting presentation program 300 determines that a meeting ends based on identifying one or more commands from a local instance of a user interface and/or instance of a teleconferencing program of a client device. In one example, an instance of meeting presentation program 300, executing on client device 120, determines that a meeting ends based on the termination of teleconferencing program 127. In another example, an instance of meeting presentation program 300, executing on client device 130, determines that a meeting ends based teleconferencing program 137 closing the connection to network 110.

In some embodiments, meeting presentation program 300 determines that a temporary breakout meeting (e.g., a child discussion) ends; however, the original meeting continues (e.g., persists) based on one or more commands input via a UI and/or responses from an instance of a teleconferencing program, such as teleconferencing program 127. In some scenarios, meeting presentation program 300 determines that a temporary breakout meeting ends and that one or more client devices terminate a connection with the teleconference. In other scenarios, meeting presentation program 300 determines that a temporary breakout meeting ends and that one or more client devices rejoin the parent meeting. In other embodiments, meeting presentation program 300 determines that the original meeting (e.g., parent discussion) ends based on one or more responses from teleconferencing program 107. However, meeting presentation program 300 determines that a temporary breakout meeting (e.g., a child discussion) persists based on one or more commands input via a UI and/or other responses from teleconferencing program 107.

Responsive to determining that a meeting does not end (No branch, decision step 308), meeting presentation program 300 presents an aspect of the meeting (step 310). In one embodiment, meeting presentation program 300 determines that the original meeting (e.g., parent discussion) does not end. In another embodiment, temporary breakout meeting (e.g., a child discussion) does not end. In some embodiments, meeting presentation program 300 determines both the original meeting and one or more breakout meetings do not end (e.g., both meetings persist).

In step 310, meeting presentation program 300 presents an aspect of the meeting. Meeting presentation program 300 may receive information that affects the presentation of an aspect of a meeting based on: an obtained set of data associated with the meeting (step 302), information embedded within a received portion of a meeting, data received from a moderator of the meeting, and/or included within data related to the meeting/participants of the meeting stored in database 105.

In one embodiment, meeting presentation program 300 utilizes a UI, such as UI 123 of client device 120 and/or UI 133 of client device 130 to present a list of users (i.e., participants) of a meeting associated with each client device (i.e., teleconferencing endpoint). In one scenario, meeting presentation program 300 includes a status for each user within a list, such as present, speaking, muted, new, not identified (NI), etc. In another scenario, meeting presentation program 300 controls which status designations are displayed. In one example, a moderator may dictate to instances of meeting presentation program 300 that only the status designations and/or indications of: speaking, new, and present are displayed. In some instances, meeting presentation program 300 may determine that users assigned the action of "to mute" remain anonymous within the status designations of user of one or more client devices. In some scenarios, with respect to a meeting including video components, meeting presentation program 300 may highlight or apply one or more indications to a user within the field of view of the video component. For example, a user that is speaking is outlined in green and an unknown user is identified with a text bubble with a question mark symbol.

In another embodiment, meeting presentation program 300 modifies one or more aspects of a meeting presentation based on whether breakout meetings occur concurrent with the original meeting. In an example, meeting presentation program 300 modifies the items displayed within each UI of a respective instance of a teleconferencing program of a client device to identify at least which two or more client devices are participating in a breakout meeting. Based on moderator/administrator inputs and/or dictates, meeting presentation program 300 may include the names of users of each client device participating in a breakout meeting.

In some embodiments, meeting presentation program 300 modifies the presentation of aspects of a meeting as well as including a status of users. In an example, with respect to a teleconference that includes video, meeting presentation program 300 may freeze a segment of video for a group of users in response to determining that one or more users is muted. In other embodiments, meeting presentation program 300 may display a default background or agenda when a portion of a meeting is withheld from a client device by teleconferencing program 107.

In various embodiments, meeting presentation program 300 delays looping to step 302 until a portion of the meeting completes. In one scenario, meeting presentation program 300 delays looping until one or more commands is received from teleconferencing program 107. In another scenario, meeting presentation program 300 delays looping based on a delay duration or polling rate included in an obtained set of data associated with the meeting and/or the current portion of the meeting. In other embodiments, meeting presentation program 300 continuously loops unless directed to pause by one or more commands from teleconferencing program 107.

Referring to decision step 308, responsive to determining that a meeting ends (Yes branch, decision step 308), meeting presentation program 300 terminates.

Figure 4:
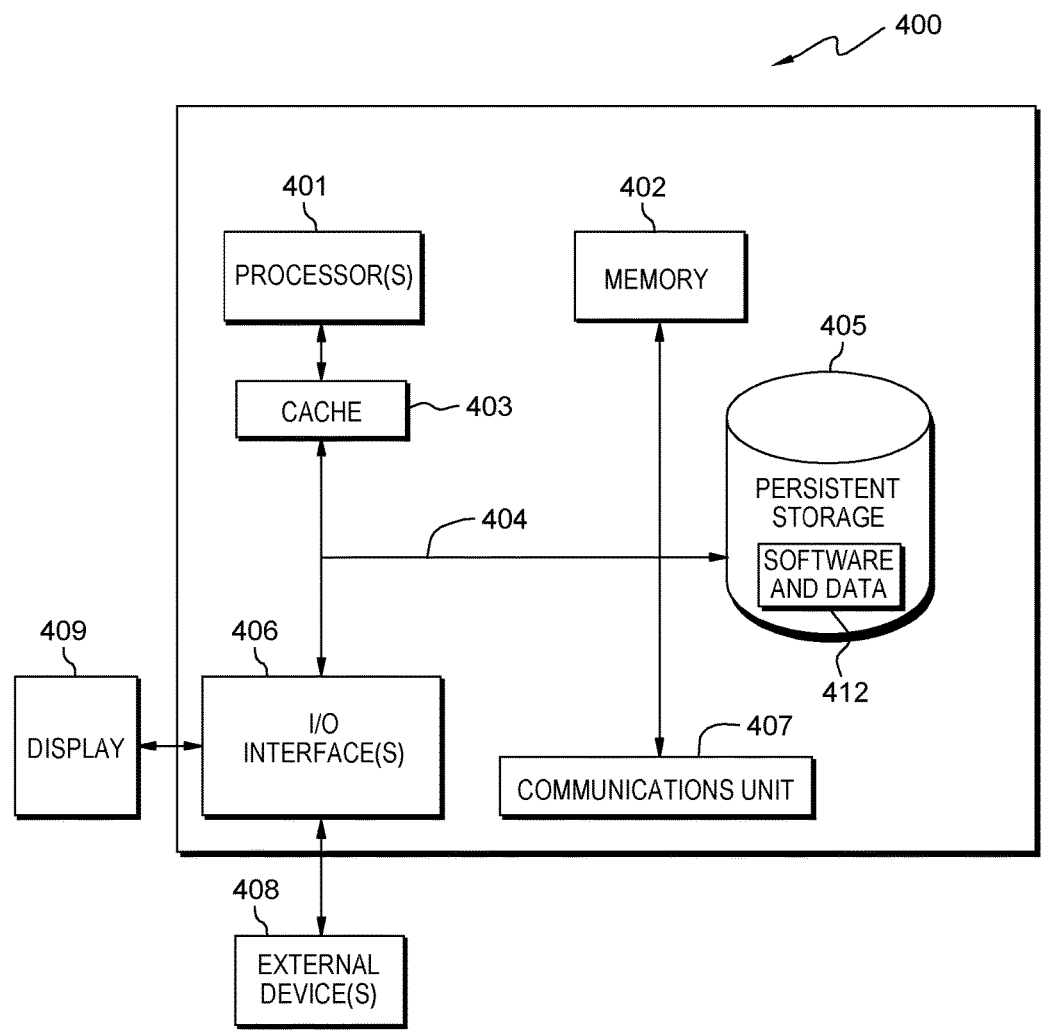
FIG. 4 is a block diagram of components of a computer, in accordance with an embodiment of the present invention.

FIG. 4 depicts computer system 400, which is representative of computing system 102, client device 120, and client device 130. Computer system 400 is an example of a system that includes software and data 412. Computer system 400 includes processor(s) 401, memory 402, cache 403, persistent storage 405, communications unit 407, input/output (I/O) interface(s) 406, and communications fabric 404. Communications fabric 404 provides communications between memory 402, cache 403, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. With respect to computing system 102, storage 104 is included within a portion of persistent storage 405.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to computing system 102, software and data 412 includes UI 103, database 105, analytics suite 106, teleconferencing program 107, user identification program 108, and various programs (not shown). Still with respect to computing system 102, software and data 412 may also include an instance of meeting monitoring program 200 and/or meeting presentation program 300. With respect to client devices 120 and 130 software and data 412 respectively includes UI 123 and 133, teleconferencing program 127 and 137, an instance of meeting monitoring program 200 and meeting presentation program 300, and various programs and data (not show).

Communications unit 407, in these examples, provides for communications with other data processing systems or devices, including resources of computing system 102, client device 120, and client device 130. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, microphone, and/or some other suitable input device, represented by I/O device 121 of client device 120 and/or I/O device 131 of client device 130. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for identifying and managing users within a group during a teleconference, the method comprising:
   determining, by one or more computer processors, that at least two users provide audio input to a single input/output (I/O) device capable of audio capture, to communicate, via a teleconference with one or more other users utilizing at least a second client device, wherein the single I/O device is operatively coupled to a first client device;
   identifying, by one or more computer processors, a first user, of the at least two users that provide audio input to the single I/O device, that is speaking during a first portion of the teleconference, based at least in part, on audio input by the first user to the single I/O device;
   determining, by one or more computer processors, an action corresponding to the first user, wherein the action controls distributing content of the teleconference at one or more client devices while the first user speaks, and wherein determining the action corresponding to the first user further comprises:
      identifying, by one or more computer processors, a set of actions and related conditions associated with the first user and content spoken by the first user;
   in response to identifying the first user speaking during the first portion of the teleconference, determining, by one or more computer processors, whether a first related condition occurs;
   in response to determining that the first related condition occurs while the first user is speaking, automatically initiating, by one or more computer processors, at the first client device, a first action corresponding to the first user based on the content spoken by the first user and the first related condition, while the first user is speaking; and
   in response to determining that the first action corresponding to the first user is not automatically initiated by the first client device based on the content spoken by the first user, embedding, by one or more computer processors, a second action corresponding to the first user and further based on the content spoken by the first user, within a stream of information that includes a corresponding portion of the teleconference during which the first user speaks for transmission to at least the second client device.

2. The method of claim 1, wherein identifying the first user of the at least two users that provide audio input to the single I/O device further comprises:
   determining, by one or more computer processors, an identity of the first user based, at least in part, on comparing a portion of audio input by the first user with a plurality of voiceprints stored within one or more databases.

3. The method of claim 1, wherein identifying the first user of the at least two users provide audio input to the single I/O device further comprises:
   determining, by one or more computer processors, that an identity of the first user is unknown based, at least in part, on comparing a portion of audio input by the first user with a plurality of voiceprints stored within one or more databases, wherein the stored voiceprints do not include a voiceprint corresponding to the first user.

4. The method of claim 3, further comprising:
   in response to determining that the identity of the first user is unknown, receiving, by one or more computer processors, one or more actions input by a moderator of the teleconference, the one or more actions input by the moderator of the teleconference further comprises:
      initiating, by one or more computer processors, a default response associated with an unknown user;
      verifying, by one or more computer processors, the identity of first user;
      storing, by one or more computer processors, a copy of a voiceprint corresponding to the first user within at least one database that stores voiceprints; and
      assigning, by one or more computer processors, one or more actions that correspond to the first user in response to the first user speaking during one or more other portions of the teleconference.

5. The method of claim 1, wherein the teleconference is based on communicating via a digital format and a shared protocol over a network, wherein the shared protocol enables embedding one or more actions to control distributing content among a hosting device and two or more client devices associated with the teleconference and wherein an embedded action selectively initiates at a device associated with the teleconference based on identifying a related condition.

6. The method of claim 1, wherein the automatically initiated first action includes filtering the content spoken by the first while the first related condition occurs.

7. The method of claim 1, wherein the automatically initiated first action includes blocking the content spoken by the first user from inclusion within a transcript of the teleconference.

8. The method of claim 1, wherein related conditions associated with the first user and content spoken by the first user is selected from the group consisting of one or more keywords, a location of a respective client device, and respective identities of one or more participants of the teleconference at the respective client device.

9. A computer program product for identifying and managing users within a group during a teleconference, the computer program product comprising:
   one or more computer readable storage media and program instructions stored on the one or more computer readable storage media, the program instructions readable/executable by one or more computer processors:
      program instructions to determine that at least two users provide audio input to a single input/output (I/O) device capable of audio capture, to communicate, via a teleconference with one or more other users utilizing at least a second client device, wherein the single I/O device is operatively coupled to a first client device;
      program instructions to identify a first user, of the at least two users that provide audio input to the single I/O device, that is speaking during a first portion of the teleconference, based at least in part, on audio input by the first user to the single I/O device;

program instructions to determine an action corresponding to the first user, wherein the action controls distributing content of the teleconference at one or more client devices while the first user speaks, and wherein program instruction to determine the action corresponding to the first user further comprise:
program instructions to identify a set of actions and related conditions associated with the first user and content spoken by the first user;
program instructions to respond to identifying the first user speaking during the first portion of the teleconference by determining whether a first related condition occurs;
program instructions to respond to determining that the first related condition occurs while the first user is speaking by automatically initiating, at the first client device, a first action corresponding to the first user based on the content spoken by the first user and the first related condition, while the first user is speaking; and
program instruction to respond to determining that the first action corresponding to the first user is not automatically initiated by the first client device based on the content spoken by the first user by embedding a second action corresponding to the first user and further based on the content spoken by the first user, within a stream of information that includes a corresponding portion of the teleconference during which the first user speaks for transmission to at least a second client device.

10. The computer program product of claim 9, wherein program instructions to identify the first user of the at least two users that provide audio input to the single I/O device further comprises:
program instructions to determine an identity of the first user based, at least in part, on comparing a portion of audio input by the first user with a plurality of voiceprints stored within one or more databases.

11. The computer program product of claim 9, wherein program instructions to identify the first user of the at least two users that provide audio input to the single I/O device further comprises:
program instructions to determine that an identity of the first user is unknown based, at least in part, on comparing a portion of audio input by the first user with a plurality of voiceprints stored within one or more databases, wherein the stored voiceprints do not include a voiceprint corresponding to the first user.

12. The computer program product of claim 11, further comprising:
in response to program instruction to determining that the identity of the first user is unknown, program instruction to receive one or more actions input by a moderator of the teleconference, the one or more actions input by the moderator of the teleconference further comprises:
program instructions to initiate a default response associated with an unknown user;
program instruction to verify the identity of first user;
program instruction to store a copy of a voiceprint corresponding to the first user within at least one database that stores voiceprints; and
program instructions to assign one or more actions that correspond to the first user in response to the first user speaking during one or more other portions of the teleconference.

13. The computer program product of claim 9, wherein the teleconference is based on communicating via a digital format and a shared protocol over a network, and wherein the shared protocol enables embedding one or more actions to control distributing content among a hosting device and two or more client devices associated with the teleconference and wherein an embedded action selectively initiates at a device associated with the teleconference based on identifying a related condition.

14. A computer system for identifying and managing users within a group during a teleconference, the computer system comprising:
one or more computer processors;
one or more computer readable storage media;
program instructions stored on the computer readable storage media for reading/execution by at least one of the one or more computer processors, the program instructions further comprising:
program instructions to determine that at least two users provide audio input to a single input/output (I/O) device capable of audio capture, to communicate, via a teleconference with one or more other users utilizing at least a second client device, wherein the single I/O device is operatively coupled to a first client device;
program instructions to identify a first user, of the at least two users that provide audio input to the single I/O device, that is speaking during a first portion of the teleconference, based at least in part, on audio input by the first user to the single I/O device;
program instructions to determine an action corresponding to the first user, wherein the action controls distributing content of the teleconference at one or more client devices while the first user speaks, and wherein program instruction to determine the action corresponding to the first user further comprise:
program instructions to identify a set of actions and related conditions associated with the first user and content spoken by the first user;
program instructions to respond to identifying the first user speaking during the first portion of the teleconference by determining whether a first related condition occurs;
program instructions to respond to determining that the first related condition occurs while the first user is speaking by automatically initiating, at the first client device, a first action corresponding to the first user based on the content spoken by the first user and the first related condition, while the first user is speaking; and
program instruction to respond to determining that the first action corresponding to the first user is not automatically initiated by the first client device based on the content spoken by the first user by embedding a second action corresponding to the first user and further based on the content spoken by the first user, within a stream of information that includes a corresponding portion of the teleconference during which the first user speaks for transmission to at least a second client device.

15. The computer system of claim 14, wherein program instructions to identify the first user of the at least two users that provide audio input to the single I/O device further comprises:
program instructions to determine an identity of the first user based, at least in part, on comparing a portion of audio input by the first user with a plurality of voiceprints stored within one or more databases.

16. The computer system of claim 14, wherein program instructions to identify the first user of the at least two users that provide audio input to the single I/O device further comprises:
  program instructions to determine that an identity of the first user is unknown based, at least in part, on comparing a portion of audio input by the first user with a plurality of voiceprints stored within one or more databases, wherein the stored voiceprints do not include a voiceprint corresponding to the first user.

17. The computer system of claim 16, further comprising:
  in response to program instruction to determining that the identity of the first user is unknown, program instruction to receive one or more actions input by a moderator of the teleconference, the one or more actions input by the moderator of the teleconference further comprises:
    program instructions to initiate a default response associated with an unknown user;
    program instruction to verify the identity of first user;
    program instruction to store a copy of a voiceprint corresponding to the first user within at least one database that stores voiceprints; and
    program instructions to assign one or more actions that correspond to the first user in response to the first user speaking during one or more other portions of the teleconference.

18. The computer system of claim 14, wherein the teleconference is based on communicating via a digital format and a shared protocol over a network, and wherein the shared protocol enables embedding one or more actions to control distributing content among a hosting device and two or more client devices associated with the teleconference and wherein an embedded action selectively initiates at a device associated with the teleconference based on identifying a related condition.

* * * * *